June 13, 1939.    A. F. BAKER    2,162,049
FISHING LURE
Filed Jan. 17, 1938

INVENTOR
*A. F. Baker*
BY
ATTORNEY

Patented June 13, 1939

2,162,049

UNITED STATES PATENT OFFICE 2,162,049

FISHING LURE

Albert F. Baker, Santa Rosa, Calif., assignor of three-fourths to Albert M. Baker, Stockton, Calif.

Application January 17, 1938, Serial No. 185,282

2 Claims. (Cl. 43—46)

This invention relates generally to fishing tackle and in particular relates to an improvement in fishing lures, and more specifically to the manner of connecting the hooks with the remainder of the tackle.

Fishermen often lose a portion of their tackle when a fish strikes due to the fact that the force of the "strike" breaks the leader or line. It is therefore the principal object of my invention to provide an arrangement whereby the hook or hooks are resiliently connected with the remainder of the tackle so that the tackle can withstand the sudden shock of a strike without breaking.

It is also an object of my invention to provide a resilient connection arranged to function, upon a fish striking a hook, to set such hook and prevent loss of the fish as often occurs when the hook is not properly set in the fish's mouth.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
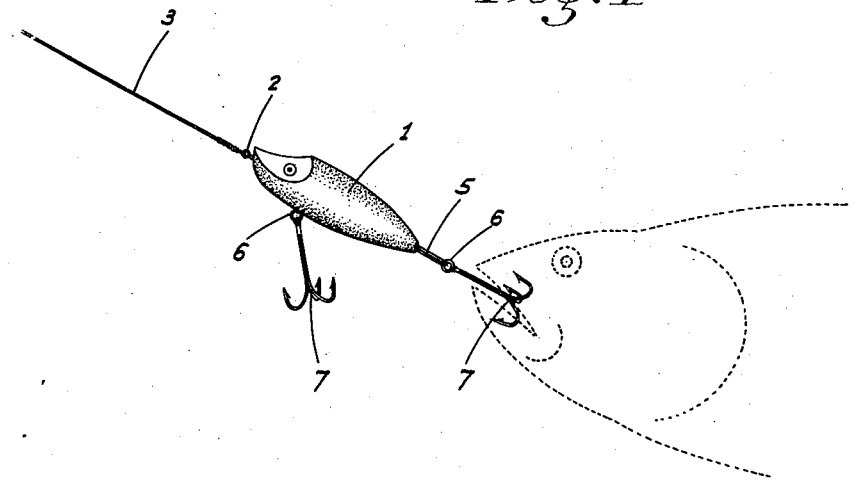
Figure 1 is an elevation of a fishing plug with my invention incorporated therein; the rear hook being shown in position as struck by a fish.
Figure 2:
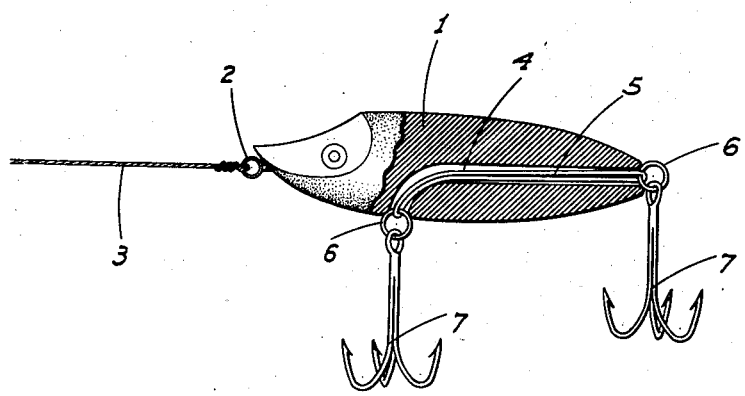
Figure 2 is a sectional elevation of a fishing plug embodying the invention.

Referring now more particularly to the characters of reference on the drawing, my invention in the present instance is shown embodied in what is known as a fishing plug, but the invention may—if desired—be incorporated in other types of lures or tackle.

The numeral 1 indicates the body of a fishing plug of common general configuration but of fanciful design. The plug body is provided at the forward end with a connector ring 2 to which a leader or line 3 is secured. A bore 4 extends lengthwise in the plug body from the rear end and curves downward to an opening in the underside of the plug body intermediate the ends thereof. And endless elastic band 5 of suitable strength is threaded through the bore and connects at each end with a ring 6 of a diameter greater than the diameter of the bore whereby the rings cannot enter said bore. A hook 7 of the multiple prong or cluster type, is secured to each ring as shown.

With my invention embodied in fishing tackle, the shock of a strike is absorbed by the resilient element (illustrated as and preferably an elastic band) and the rebound thereof positively sets the hook and prevents escape of the fish.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination, a fishing lure including a body having a bore therethrough, a resilient element in the bore and a pair of fish hooks detached from the body and connected to the ends of the element.

2. A device as in claim 1 in which the bore is open at one end to the rear end of the body and extends forward lengthwise in the body some distance and then turns downward to an opening in the under side of said body intermediate the ends thereof.

ALBERT F. BAKER.